Feb. 18, 1964     R. B. CRONHEIM     3,121,450
FOOD SHREDDER AND CHOPPER

Filed May 14, 1962     2 Sheets-Sheet 1

INVENTOR.
RICHARD B. CRONHEIM
BY
*Alfred W. Petchaft*
ATTORNEY

Feb. 18, 1964  R. B. CRONHEIM  3,121,450
FOOD SHREDDER AND CHOPPER
Filed May 14, 1962  2 Sheets-Sheet 2

INVENTOR.
RICHARD B. CRONHEIM
BY Alfred W Petchaft
ATTORNEY

United States Patent Office 3,121,450
Patented Feb. 18, 1964

3,121,450
FOOD SHREDDER AND CHOPPER
Richard B. Cronheim, 411 N. 7th St., St. Louis 1, Mo.
Filed May 14, 1962, Ser. No. 194,292
4 Claims. (Cl. 146—177)

This invention relates in general to certain new and useful improvements in culinary implements and, more particularly, to a combined manual food chopper and grater.

Most homemakers utilize hand choppers and graters for comminuting, dicing, and shredding various foodstuffs, such as vegetables, bread crumbs, salad greens and the like. However, such culinary devices are difficult to hold and rather inconvenient to manipulate. Moreover, none of the various desired functions are combined into a single simplified implement. In fact, the average domestic kitchen is usually equipped with two or three such devices.

Conventional food graters are usually constructed as a somewhat tapered tubular unit having four trapezoidal sides with a rectangular bottom margin and some form of handle at the top. Such devices are usually held more or less vertically and supported upon the bottom margin which rests in flush position upon a table-top, kitchen counter or similar structure. In such position, the grater is difficult to hold and to use, frequently resulting in cut fingers or skinned knuckles as the food is manually pushed to and fro across the cutting or shredding surfaces. In addition, when such shredders are used in this conventional manner, the shredded food piles up very quickly within the enclosed interior and the cutting apertures become clogged. Finally, by reason of the somewhat enclosed tubular construction, conventional shredders are somewhat difficult to clean.

It is, therefore, one of the primary objects of the present invention to provide a culinary implement which combines a number of different food-comminuting functions in a single device, thereby contributing materially to convenience in use.

It is another object of the present invention to provide a culinary implement of the type stated which is compact and constructed with a unique form of handle which is of such shape and location that the culinary implement is extremely easy to hold in one hand and, therefore, convenient and efficient in use and operation.

It is a further object of the present invention to provide a culinary implement of the type stated which is economical in construction and capable of functioning both as a food shredder and food chopper so that the housewife is presented with minimal storage problems and has immediately available, in a single implement, a multiplicity of essential functions and, therefore, need not waste the time involved in using several different culinary implements for a series of related food-preparatory operations.

It is also an object of the present invention to provide a culinary implement of the type stated which can be used on a table-top, kitchen counter or similar structure in a simple and convenient manner and will not tend to clog up or become choked with the food which has been comminuted through it.

It is an additional object of the present invention to provide a culinary implement of the type stated which is extremely easy to clean and maintain in a satisfactory sanitary condition.

With the above and other objects in view, my invention resides in the novel features of form, construction, arrangement, and combination of parts presently described and pointed out in the claims.

In the accompanying drawings (two sheets)—
FIG. 1 is a front elevational view of a culinary implement constructed in accordance with and embodying the present invention;

Figure 1:
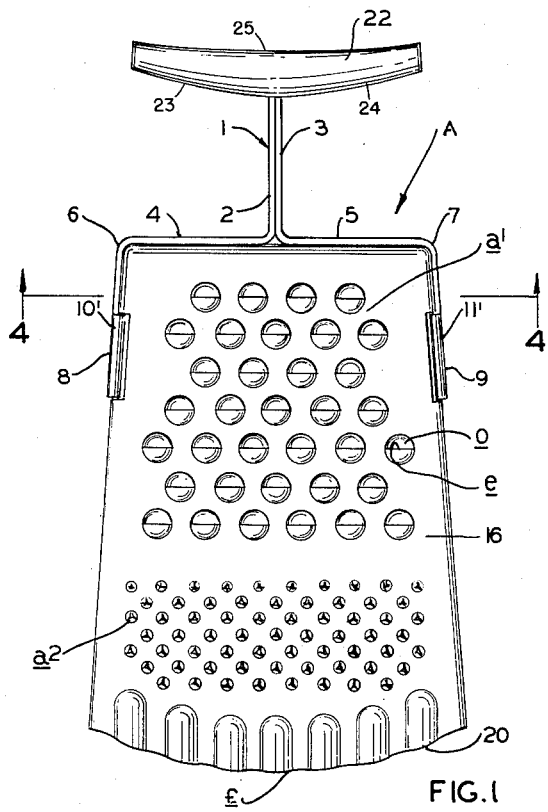
Figure 2:
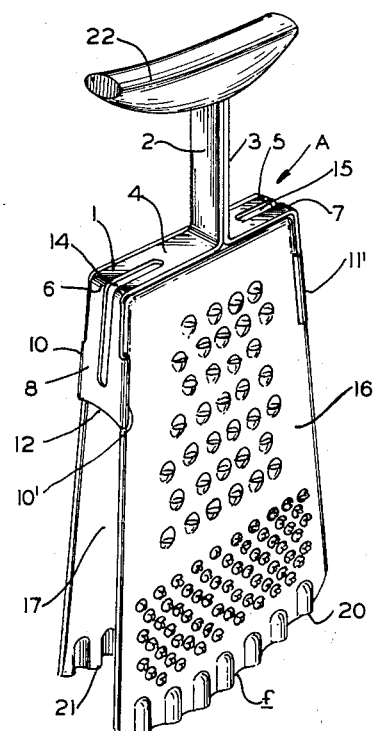
FIG. 2 is a perspective view of the culinary implement shown in FIG. 1.
Figure 3:
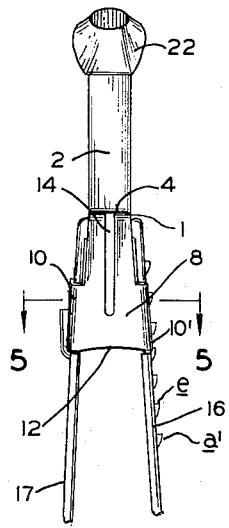
FIG. 3 is a fragmentary end elevational view of the culinary implement shown in FIG. 1.
Figure 4:
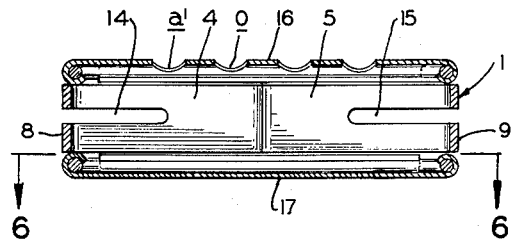
FIG. 4 is a horizontal sectional view of the culinary implement taken along line 4—4 of FIG. 1.
Figure 6:
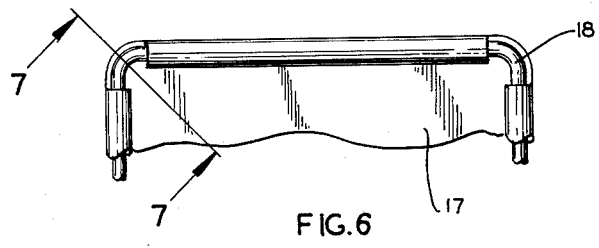
FIG. 6 is a fragmentary sectional view on an enlarged scale taken along line 6—6 of FIG. 4.
Figure 5:
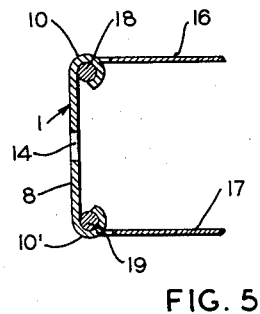
FIG. 5 is a transverse sectional view on an enlarged scale taken along line 5—5 of FIG. 3.
Figure 7:
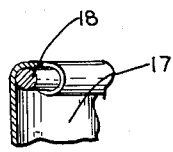
FIG. 7 is a fragmentary sectional view taken along line 7—7 of FIG. 6.

Referring now in more detail and by reference characters to the drawings, which illustrate a preferred embodiment of the present invention, A designates a culinary implement comprising a main frame 1 formed of heavy gauge steel ribbon stock and integrally including two centrally disposed facewise abutting handle-supporting bars 2, 3, which curve outwardly at their extremities and merge into two laterally projecting shoulder plates 4, 5, which are mutually co-planar and substantially perpendicular to the supporting bars 2, 3. At their outer extremities the shoulder plates 4, 5, are curved in the provision of rounded shoulders 6, 7, and merge into side plates 8, 9, which are substantially parallel to each other and are respectively provided with outwardly divergent side margins 10, 10', 11, 11', and slightly concave bottom margins 12, 13, respectively. The main frame 1 is finally provided with L-shaped slots 14, 15, which respectively extend across the shoulders 6, 7, substantially as shown in FIGS. 2 and 3.

Seated snugly against the main frame 1 are two relatively flat shredder-plates 16, 17, which are respectively curled, along their sides and upper margins around U-shaped frame members 18, 19, formed of heavy wire. The curled portions extending along the lateral margins of the shredder-plates 16, 17, are crimped or flattened inwardly around the lower extremities of the frame members 18, 19, so as to enclose the latter and afford additional securement between the shredder-plates 16, 17, and frame members 18, 19. The lower margins 20, 21, of the shredder-plates 16, 17, are curved downwardly in parallel arcs concentric with the longitudinal center-line of the culinary implement A and provided with a series of upwardly extending flutes $f$ which are somewhat in the nature of sinuous corrugations in transverse cross-sectional contour. Moreover, the lower margins 20, 21, are sharpened to provide chopping edges and, finally, the interior areas of the shredder-plates 16, 17 are provided with punched-out openings $o$, each having an outwardly deformed sharpened comminuting or shredding edge $e$. As can be seen by reference to FIGS. 8 and 9, the openings $o$ are arranged in several groups of different sizes so as to provide a number of different areas $a^1$, $a^2$, $a^3$, $a^4$, which are capable of shredding or grating vegetables and similar foodstuffs into different sized shreds or particles.

Bolted upon and securely fastened to the upper end of the handle-supporting bars 2, 3, is a handle 22 which extends symmetrically outwardly on opposite sides of the bars 2, 3, and is provided with upwardly and outwardly tapering arcuate undersurfaces 23, 24. The top 25 of the handle 22 is flattened and slightly depressed toward the transverse center-line in the manner of a very obtuse dihedral angle. In its various contours, the handle 22 is shaped in such a manner as to fit very comfortably in the hand of the average housewife in such a manner that her fingers may curl comfortably therearound.

In use, the culinary implement A can be firmly grasped in one hand and moved upwardly and downwardly in sharp reciprocating strokes over a chopping board or chopping bowl so that the sharpened arcuate margins 20, 21, will chop vegetables or other similar foodstuffs to any desired degree of fineness. In case a concave chopping bowl is used, it is also possible to rock the culinary implement to-and-fro along the arcuate margins 20, 21, to comminute the foodstuffs in a rocking and slicing motion without being lifted from the surface of the chopping bowl.

Figure 8:
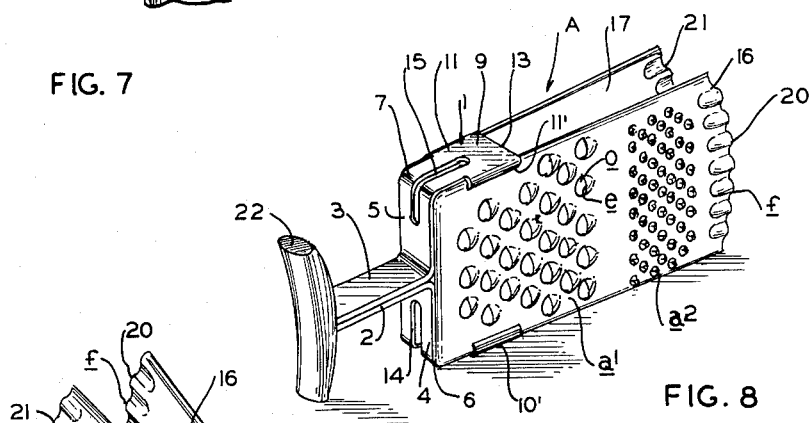
FIGS. 8 and 9 are perspective views of the culinary implement respectively showing the front and rear food shredding surfaces thereof as the culinary implement is disposed for actual use in laterally supported position upon a table-top, kitchen counter or other domestic working surface.
Figure 9:
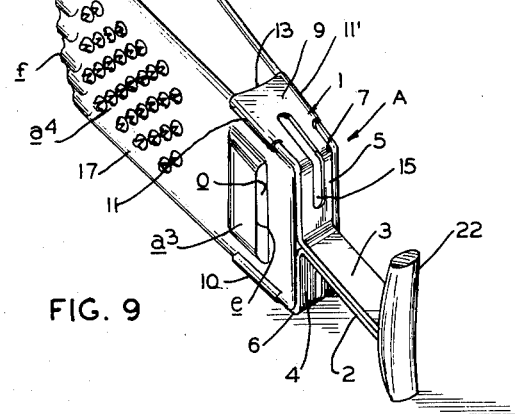

If it is desired to use the culinary implement A as a shredder or grater, it can be laid down upon either side, as shown in FIGS. 8 and 9, upon a flat table-top, kitchen counter, or the like. The handle 22 is of such length that one or the other of the transverse ends thereof will lie flatwise upon the table-top in coplanar alignment with the lateral surfaces of the shredder-plates 16, 17, which also rest upon the table-top, thereby providing a firm stable structure which may be conveniently held in place with one hand while the vegetables or other foodstuffs are pushed across the comminuting edges e. It will be noted, in this connection, that the culinary implement A, when in such position, is open along the top and outer ends so that as shredded food accumulates between the shredder-plates 16, 17, the culinary implement A may be slid progressively away from the accumulating pile of shredded foodstuff so that the housewife may shred or grate a large quantity of material progressively continuously and in a convenient and rapid manner without clogging the interior surfaces of the shredder-plates 16, 17.

Finally, when comminuting, chopping, shredding or grating operations have been concluded, the culinary implement A can be easily and conveniently held under a water faucet or dipped into a pan of dishwater and thoroughly cleaned. The slots 14, 15, in the shoulders 6, 7, materially contribute to the ease of cleansing and either or both of these can be held beneath a stream of water so that the interior surfaces of the shredder-plates 16, 17, can be quickly and effectively sluiced and thereby cleansed of any clinging particles or shreds of material.

It should be understood that changes and modifications in the form, construction, arrangement, and combination of the several parts of the culinary implements may be made and substituted for those herein shown and described without departing from the nature and principle of my invention.

Having thus described my invention, what I claim and desire to secure by Letters Patent is:

1. A culinary implement comprising a main frame having a bight and two leg-elements, an outwardly extending element connected to the frame centrally of the bight and being provided at its outer end with a handle and at its other end with a pair of spaced marginally registering shredder plates engaged at their upper ends in the frame and diverging downwardly therefrom, each of said plates having side margins and a transverse margin extending between the outer ends of the side margins, said shredder plates each having areas provided with openings with sharpened edges for comminuting food-stuffs and also each being provided with outer transverse margins which are sharpened for cutting and chopping food-stuffs, said shredder plates being separate from each other along substantial portions of their side margins and along their entire transverse margins.

2. A culinary implement comprising a main frame having an outwardly extending element provided at its outer end with a handle and at its other end with a pair of spaced shredder plates each having side margins and a transverse margin extending between the outer ends of the side margins, the side margins of one shredder plate being respectively coplanar with the side margins of the other shredder plate, said shredder plates each having areas provided with openings with sharpened edges for comminuting food-stuffs and also each being provided with outer arcuate transverse margins which are sharpened for cutting and chopping food-stuffs, said arcuate transverse margins being in lateral registration with each other.

3. A culinary implement comprising a main frame having a bight and two leg-elements, an outwardly extending element connected to the frame centrally of the bight and being provided at its outer end with a handle and at its other end with a pair of spaced marginally registering shredder plates engaged at their upper ends in the frame and diverging downwardly therefrom, each of said plates having side margins and a transverse margin extending between the outer ends of the side margins, said shredder plates each having areas provided with openings with sharpened edges for comminuting food-stuffs and also each being provided with outer transverse margins which are sharpened for cutting and chopping food-stuffs, said shredder plates being separate from each other along substantial portions of their side margins and along their entire transverse margins, said handle having flat end-faces which are substantially coplanar with the proximate pairs of side margins of the shredder plates so that the culinary implement will rest firmly on either side when so placed on a flat supporting surface such as a table top, said shredder plates, furthermore by reason of the separation between side margins, being fully open to the supporting surface both downwardly between the side margins and outwardly between the transverse margins so that shredded food-stuffs will not pile up between the shredder plates and clog them during shredding operations.

4. A culinary implement comprising a main frame having an outwardly extending element provided at its outer end with a handle and at its other end with a U-shaped member having opposite lateral margins, and a pair of spaced shredder plates rigidly secured to the U-shaped member along said lateral margins respectively, each of said shredder plates having side margins and a transverse margin extending between the outer ends of the side margin, said shredder plates further being provided with areas having openings with sharpened edges for comminuting food-stuffs, the transverse margins of the shredder plates being sharpened for cutting and chopping food-stuffs, said shredder plates being separated from each other along a substantial portion of their side margins and along their entire right transverse margins, said U-shaped member having elongated L-shaped openings through which a stream of water can be directed against the internal faces of the shredder plates.

References Cited in the file of this patent

UNITED STATES PATENTS

| D. 125,337 | Higginbotham | Feb. 18, 1941 |
| 411,568 | Becker | Sept. 24, 1889 |
| 1,887,714 | Hemp | Nov. 15, 1932 |
| 2,225,658 | Rauchfuss | Dec. 24, 1940 |
| 2,482,180 | Heard | Sept. 20, 1949 |

FOREIGN PATENTS

| 8,705 | Great Britain | Apr. 14, 1898 |
| 27,111 | Great Britain | Dec. 22, 1898 |
| 137,983 | Austria | June 11, 1934 |